(12) United States Patent
Seo et al.

(10) Patent No.: US 12,540,656 B2
(45) Date of Patent: Feb. 3, 2026

(54) DRIVING MOTOR SYSTEM OF ELECTRIC MOBILITY AND DRIVING SYSTEM COMPRISING THE SAME

(71) Applicant: HL MANDO CORPORATION, Gyeonggi-do (KR)

(72) Inventors: Jaeman Seo, Gyeonggi-do (KR);
Dongmin Lee, Gyeonggi-do (KR);
Myunghwan Kim, Gyeonggi-do (KR);
Yongsuk Hwang, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 119 days.

(21) Appl. No.: 18/241,205

(22) Filed: Aug. 31, 2023

(65) Prior Publication Data
US 2024/0421657 A1    Dec. 19, 2024

(30) Foreign Application Priority Data

Jun. 15, 2023  (KR) .......................... 10-2023-0076634

(51) Int. Cl.
*F16H 1/28*       (2006.01)
*F16H 57/08*    (2006.01)
(Continued)

(52) U.S. Cl.
CPC .............. *F16H 1/28* (2013.01); *F16H 57/08* (2013.01); *H02K 7/116* (2013.01); *H02K 11/33* (2016.01);
(Continued)

(58) Field of Classification Search
CPC .... H02K 7/116; H02K 11/33; H02K 2203/09; F16H 1/28; F16H 57/08; F16H 57/0037;
(Continued)

(56) References Cited

U.S. PATENT DOCUMENTS

| | | | | |
|---|---|---|---|---|
| 4,862,770 A | * | 9/1989 | Smith | ...................... F02B 67/04 475/324 |
| 4,998,052 A | * | 3/1991 | Erdman | ................ D06F 37/304 318/696 |

(Continued)

FOREIGN PATENT DOCUMENTS

| | | |
|---|---|---|
| EP | 0 697 759 | 3/2000 |
| JP | 2007-327569 | 12/2007 |

(Continued)

OTHER PUBLICATIONS

Extended European Search Report dated Feb. 5, 2024 for European Patent Application No. 23190981.3.
(Continued)

*Primary Examiner* — Timothy Hannon
(74) *Attorney, Agent, or Firm* — WOMBLE BOND DICKINSON (US) LLP (57) ABSTRACT

A driving motor system and a driving system of an electric mobility are provided. The driving motor system may comprise: an inverter configured to receive DC power and convert the DC power into AC power; a motor configured to provide driving force; and a reducer configured to increase the driving force provided by the motor and transmit the driving force to a wheel of the electric mobility, wherein the motor and the reducer are installed inside a motor housing.

14 Claims, 7 Drawing Sheets

(51) Int. Cl.
  *H02K 7/116* (2006.01)
  *H02K 11/33* (2016.01)
  *B60K 7/00* (2006.01)
  *B60K 17/04* (2006.01)
  *F16H 57/02* (2012.01)

(52) U.S. Cl.
  CPC .... *B60K 7/0007* (2013.01); *B60K 2007/0061* (2013.01); *B60K 17/046* (2013.01); *F16H 2057/02034* (2013.01); *H02K 2203/09* (2013.01)

(58) Field of Classification Search
  CPC ..... F16H 2057/02034; F16H 2057/085; B60K 7/0007; B60K 2007/0061; B60K 17/046
  See application file for complete search history.

(56) References Cited

U.S. PATENT DOCUMENTS

| | | | | |
|---|---|---|---|---|
| 5,195,389 | A * | 3/1993 | Isozumi | F02N 15/046 310/83 |
| 5,328,419 | A * | 7/1994 | Motl | F16H 3/56 475/338 |
| 5,385,514 | A * | 1/1995 | Dawe | F16H 13/06 475/341 |
| 6,080,077 | A * | 6/2000 | Kamlukin | F16H 57/082 180/372 |
| 6,425,838 | B1 * | 7/2002 | Matsubara | F02N 15/006 903/910 |
| 2007/0078035 | A1 * | 4/2007 | Oshidari | F16H 1/46 475/149 |
| 2009/0101424 | A1 * | 4/2009 | Suzuki | B60K 17/043 180/65.51 |
| 2013/0049549 | A1 | 2/2013 | Folmli et al. | |
| 2014/0031160 | A1 * | 1/2014 | Suzuki | F16H 57/082 475/149 |
| 2016/0068054 | A1 * | 3/2016 | Abe | F16D 3/185 180/65.51 |
| 2019/0068028 | A1 * | 2/2019 | Tominaga | B60K 11/02 |
| 2019/0331203 | A1 | 10/2019 | Mei et al. | |
| 2021/0009232 | A1 | 1/2021 | Liu et al. | |

FOREIGN PATENT DOCUMENTS

| | | |
|---|---|---|
| JP | 3194818 | 12/2014 |
| KR | 10-2022-0089973 | 6/2022 |
| KR | 10-2477058 | 12/2022 |

OTHER PUBLICATIONS

Office Action dated Jun. 30, 2025 for Korean Patent Application No. 10-2023-0076634 and its English translation provided by Applicant's foreign counsel.

* cited by examiner

DRIVING MOTOR SYSTEM OF ELECTRIC MOBILITY AND DRIVING SYSTEM COMPRISING THE SAME

CROSS-REFERENCE TO RELATED APPLICATION

This application claims the benefit of and priority to Korean Patent Application No. 2023-0076634 filed on Jun. 15, 2023, the entire disclosures of which are incorporated herein by reference.

TECHNICAL FIELD

The present disclosure relates to a driving motor system of an electric mobility and a driving system comprising the same. More specifically, the present disclosure relates to a driving motor system of an electric mobility capable of optimizing the packaging of an inverter, a motor and a reducer, and to a driving system comprising the same.

BACKGROUND

In an electric mobility such as an electric bicycle or e-cargo, a person is assisted or the electric mobility is driven by driving a motor with electricity.

On the other hand, many countries around the world, such EU (European Union) countries, are transitioning from logistics delivery through vehicles or motorcycles to logistics delivery through small electric mobilities such as electric bicycles/e-cargos based on carbon reduction policies.

In this regard, Korean Patent Publication No. 10-2022-0089973 discloses an apparatus and a method for driving a chainless electric bicycle, and a driving system for driving an electric mobility such as the chainless electric bicycle is actively being developed.

From the perspective of logistics delivery, there is a market demand to load more luggage than before in electric mobilities such as electric bicycles or e-cargos, and accordingly, a high-output driving system applied to a small mobility is required.

Further, In order to optimize the packaging of the driving system applied to such a small mobility, there is a need to provide a small driving module package compared to output power.

In this regard, there is a need for a robust design of a structure of a driving system to be suitable for a high-output driving system, and a connection structure that is easy to assemble in consideration of mass productivity is also required.

PRIOR ART DOCUMENT (Patent Document) Korean Patent Publication No. 10-2022-0089973 (2022 Jun. 29)

SUMMARY

The present disclosure is to solve the above-mentioned problems of the prior art, and an object of the present disclosure is to provide a driving motor system and a driving system for promoting packaging optimization of the reducer, motor and inverter, and reduction of components in the driving motor system and driving system of the electric mobility.

Further, an object of the present disclosure is to provide a driving motor system and a driving system having a robust gear structure for power transmission and an easy-to-assemble connection structure in the driving motor system and the driving system of the electric mobility.

However, the technical problem to be achieved by the embodiments of the present disclosure is not limited to the technical problems described above, and other technical problems may exist.

As a technical means for achieving the above technical problem, a driving motor system of an electric mobility according to an embodiment of the present disclosure comprises: an inverter configured to receive DC power and convert the DC power into AC power; a motor configured to provide driving force; and a reducer configured to increase the driving force provided by the motor and transmit the driving force to aa wheel of the electric mobility, wherein the motor and the reducer are installed inside a motor housing.

Further, the reducer may comprise an input gear and an output gear, the input gear may function as a rotor shaft of the motor, and a shaft of the input gear and a shaft of the output gear may be coaxial.

Further, the reducer may further comprise at least one planetary gear, and the at least one planetary gear may be engaged with the input gear and the output gear to receive the driving force from the input gear and transmit the driving force to the output gear.

Further, the at least one planetary gear may be in plural number, and three planetary gears may be provided around the input gear.

Further, the input gear may be extended in an axial direction so as to be overlapped with the output gear, a first bearing for concentrically supporting the input gear and the output gear may be provided between the input gear and the output gear.

Further, a second bearing for supporting the output gear may be provided at the output gear on a side of the motor housing.

Further, a third bearing and a fourth bearing for supporting the at least one planetary gear may be installed at both ends of the at least one planetary gear in an axial direction.

Further, the inverter may be configured to receive DC power and convert the DC power into three-phase AC power, and comprise a three-phase bus bar for supplying the converted three-phase AC power to the motor and a sensor connector for providing feedback of detected values of a position sensor configured to detect a position of the motor, and the three-phase bus bar and the sensor connector may be connected to a terminal block provided at the motor housing.

Further, a magnet member may be installed at an end portion of the input gear on a side of the motor, and the position sensor may be installed at a position facing the magnet member, and the position of the motor may be detected by the position sensor.

Further, a fifth bearing for supporting the input gear may be installed radially outside an end portion of the input gear on a side of the motor.

Further, a sixth bearing for supporting the input gear may be additionally installed between the first bearing and the fifth bearing.

Further, a rotor hub may be interposed between the input gear and a rotor of the motor, and the input gear may be partially knurled press-fitted to the rotor hub.

Further, the rotor hub may be made of aluminum.

A driving system for an electric means of transportation according to an embodiment of the present invention comprises: a battery configured to store electrical energy; a pedal motor system configured to generate the electric energy by driving a pedal or operating a throttle; and a driving motor system mounted at at least one wheel of the electric mobility to provide rotational force to the at least one wheel, wherein the driving motor system comprises an inverter configured to receive DC power and convert the DC power into AC power; a motor configured to provide driving force; and a reducer configured to increase the driving force provided by the motor and transmit the driving force to the at least one wheel of the electric mobility, and wherein the motor and the reducer are installed inside a motor housing.

Further, the reducer may comprise an input gear and an output gear, the input gear functions as a rotor shaft of the motor, and a shaft of the input gear and a shaft of the output gear may be coaxial.

Further, the reducer may further comprise at least one planetary gear, and the at least one planetary gear may be engaged with the input gear and the output gear to receive the driving force from the input gear and transmit the driving force to the output gear.

Further, the input gear may be extended in an axial direction so as to be overlapped with the output gear, a first bearing for concentrically supporting the input gear and the output gear may be provided between the input gear and the output gear.

Further, the inverter may be configured to receive DC power and convert the DC power into three-phase AC power, and comprise a three-phase bus bar for supplying the converted three-phase AC power to the motor and a sensor connector for providing feedback of detected values of a position sensor configured to detect a position of the motor, and the three-phase bus bar and the sensor connector may be connected to a terminal block provided at the motor housing.

Further, a magnet member may be installed at an end portion of the input gear on a side of the motor, and the position sensor may be installed at a position facing the magnet member, and the position of the motor may be detected by the position sensor.

Further, a rotor hub may be interposed between the input gear and a rotor of the motor, and the input gear may be partially knurled press-fitted to the rotor hub.

The above-described means for solving the problem is merely exemplary and should not be construed as limiting the present disclosure. In addition to the exemplary embodiments described above, additional embodiments may exist in the drawings and detailed description of the invention.

According to the above-mentioned problem-solving means of the present application, in a driving motor system of an electric vehicle and a drive system including the same, it is possible to provide a driving motor system and a drive system capable of optimizing the packaging of an inverter, a motor, and a reducer can.

However, the effects obtainable from the present disclosure are not limited to the effects described above, and other effects may exist.

DETAILED DESCRIPTION

Hereinafter, with reference to the accompanying drawings, embodiments of the present disclosure will be described in detail so that those skilled in the art can easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the present disclosure.

Throughout the present disclosure, if a part is said to be "connected" to another part, it is not only "directly connected", but also "electrically connected" with another element in between, including cases where they are "indirectly connected".

Throughout the present disclosure, if one member is said to be located "on", "above", "under", or "below" the other member, this includes not only the case of being in contact with the other member, but also the case that another member is positioned between the two members.

Throughout the present disclosure, if a part "includes" a certain component, it does not mean excluding other components, and it does mean that it may further include other components, unless otherwise stated.

Various embodiments of the present disclosure generally relate to a driving motor system of an electric mobility capable of optimizing the packaging of an inverter, a motor and a reducer, and relates to a driving system comprising the same.

Figure 1:
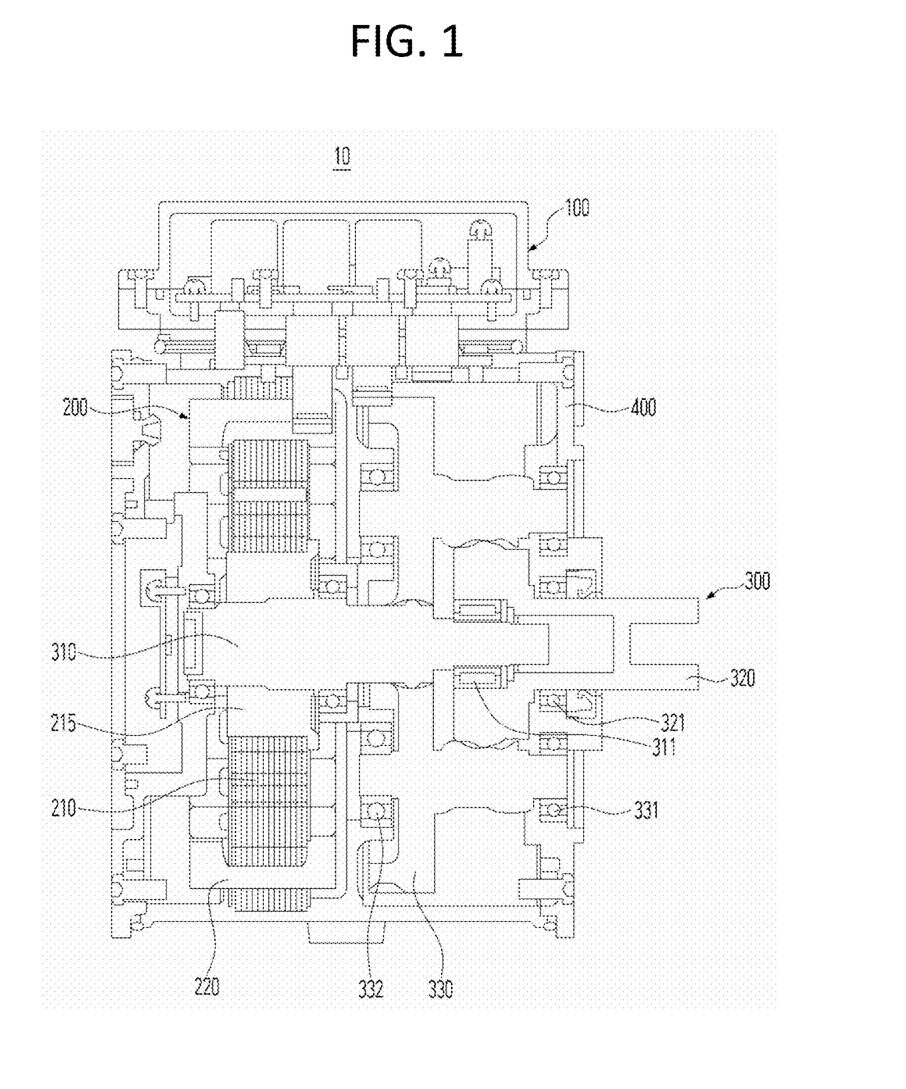
FIG. 1 is a cross-sectional view showing a driving motor system of an electric mobility according to an embodiment of the present disclosure.

FIG. 1 is a cross-sectional view showing a driving motor system of an electric mobility according to an embodiment of the present disclosure.

Referring to FIG. 1, the driving motor system 10 of the electric mobility according to the embodiment of the present disclosure may include an inverter 100 for receiving DC power and converting it into AC power, a motor 200 for providing the driving force, and a reducer 300 for increasing the driving force provided from the motor and transmitting the driving force to the wheels of the electric mobility.

Further, the motor 200 and the reducer 300 may be installed inside the motor housing 400.

The driving motor system 10 according to the embodiment of the present disclosure may be installed at a wheel of the electric mobility. That is, the driving motor system 10 may be a system that receives power from a battery installed in an electric vehicle and drives the motor to transmit generated driving force to the wheel.

The inverter 100 may convert DC power from a battery into three-phase AC power as AC power, and drive the motor 200 using the current supplied from the three-phase AC power.

The motor 200 may include a rotor 210 and a stator 220, and if the current is supplied to the coil of the stator 220, a magnetic field may be formed to rotate the rotor 210, thereby generating the driving force. The motor 200 may be a brushless AC (BLAC) motor that is a three-phase AC motor.

The rotor 210 may include a rotor shaft, and according to the embodiment of the present application, the input gear 310 included in the reducer 300 is configured to function as a rotor shaft of the rotor 210.

Accordingly, the driving force of the motor transmitted to the input gear 310 as the rotor shaft is increased by the deceleration action of the reducer 300 and is configured to be transmitted to the wheel of the electric means of transportation connected to the output shaft. It can be.

The reducer 300 may include an input gear 310 and an output gear 320, and the shaft (input shaft) of the input gear 310 and the shaft (output shaft) of the output gear 320 may be arranged coaxially.

Due to such a coaxial structure, packaging may be more advantageous in installing the driving motor system to the wheel. The structure of a conventional driving motor system in which an input shaft and an output shaft are offset has disadvantages in space utilization because it is difficult to compact the size of a module. On the contrary, according to the embodiment of the present disclosure, by configuring the output shaft to be arranged coaxially with the input shaft, it is possible to minimize the size of the driving module (driving motor system).

Referring to FIG. 1 in more detail, in the driving motor system 10 of an electric mobility according to the embodiment of the present disclosure, the reduction gear 300 may include at least one planetary gear (counter gear) 330 configured to receive the driving force from the input gear 310 and to transmit the driving force to the output gear 320. That is, the planetary gear 330 may be engaged with the input gear 310 and the output gear 320, respectively, so as to perform a reduction operation and simultaneously increase the driving force.

Figure 2:
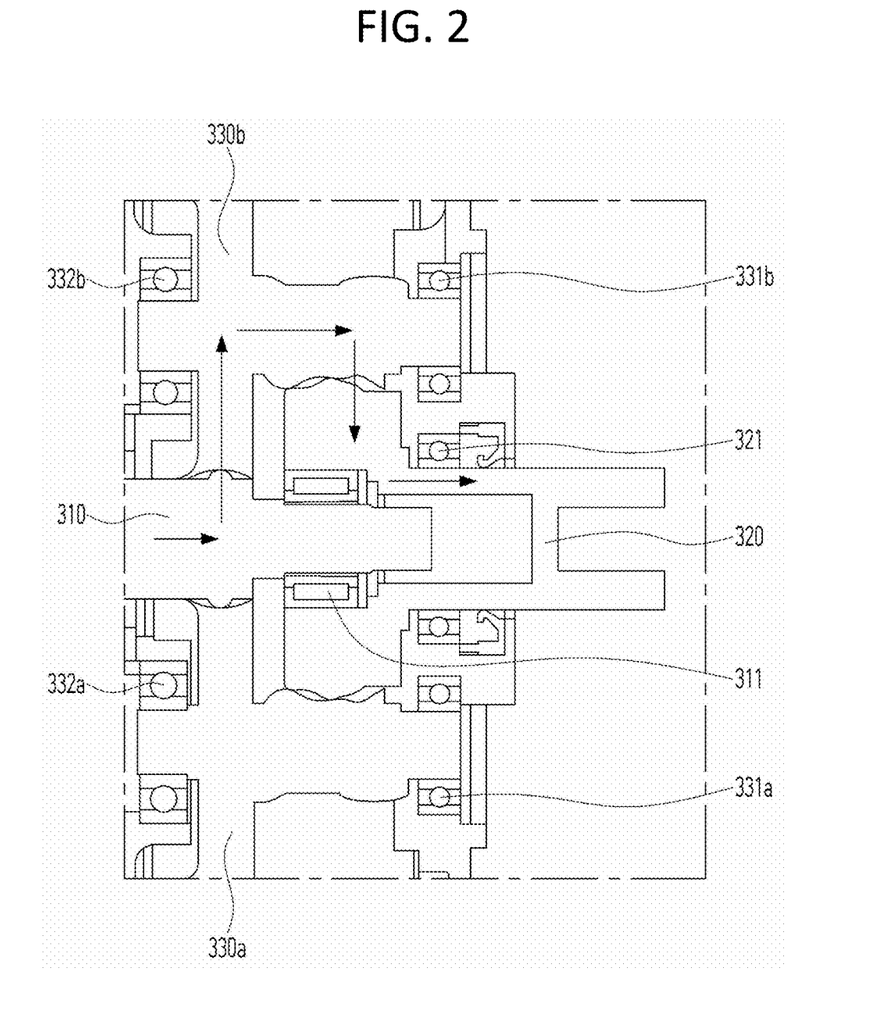
FIG. 2 is an enlarged cross-sectional view of a power transmission structure by gear engagement in the driving motor system according to the embodiment of the present disclosure.

FIG. 2 is an enlarged cross-sectional view of a power transmission structure by gear engagement in the driving motor system according to the embodiment of the present disclosure.

Looking at the power transmission by the input gear 310, the output gear 320, and the planetary gear 330 in more detail with reference to FIG. 2, the driving force from the input gear 310 serving as the rotor shaft of the motor 200 may be transmitted to the planetary gears 330a and 330b that are engaged. Subsequently, the transmitted driving force may be transmitted to the output gear 320 engaged with the planetary gears 330a and 330b.

That is, the driving force from the motor is transmitted through the route indicated by the arrow in FIG. 2, thereby increasing the driving force.

Since the at least one planetary gear 330a, 330b also may serve to support the input gear 310 and the output gear 320, it is desirable to install two or more planetary gears in order to effectively support the input gear 310 and the output gear 320.

On the other hand, since it is necessary to firmly support the coaxial structure of the input gear 310 and the output gear 320 in order to effectively transmit power, a first bearing 311 may be provided between the input gear 310 and the output gear 320. Specifically, as shown in FIG. 2, the input gear 310 may be extended in an axial direction so as to be overlapped with the output gear 320, and the first bearing 311 may be installed to concentrically support the input gear 310 and the output gear 320.

Further, a second bearing 321 for supporting the output gear 320 may be installed at the output gear 320 on the side of the motor housing 400. The second bearing 321 is a component for supporting the axis of the output gear 320, and by providing the first bearing 311 and the second bearing 321, the input gear 310 and the output gear 320 may be concentrically supported stably.

Further, at both ends of the at least one planetary gear 330 in the axial direction, a third bearing 331 and a fourth bearing 332 for axially supporting the planetary gear 330 may be installed.

As shown in FIG. 2, by installing the third bearings 331a, 331b and the fourth bearings 332a, 332b at both ends in the axial direction of the planetary gears 330a, 330b, it is possible to stably maintain the distance between the shafts between the output gear 320 and the planetary gears 330a and 330b.

According to the driving motor system of the electric mobility according to the embodiment of the present disclosure as described above, the output power from the motor 200 may be transmitted to the input gear 310, and then transmitted to at least one planetary gear 330 engaged with the input gear 310, and then, after being transmitted to the output gear 320 engaged with the at least one planetary gear 330, the output power may be transmitted to the wheel connected to the output gear 320.

In particular, by forming a structure in which the driving force is transmitted while stably coaxially supporting the input gear and the output gear, it is possible to optimize packaging and provide a driving motor system having a connection structure that is easy to assemble.

Figure 3:
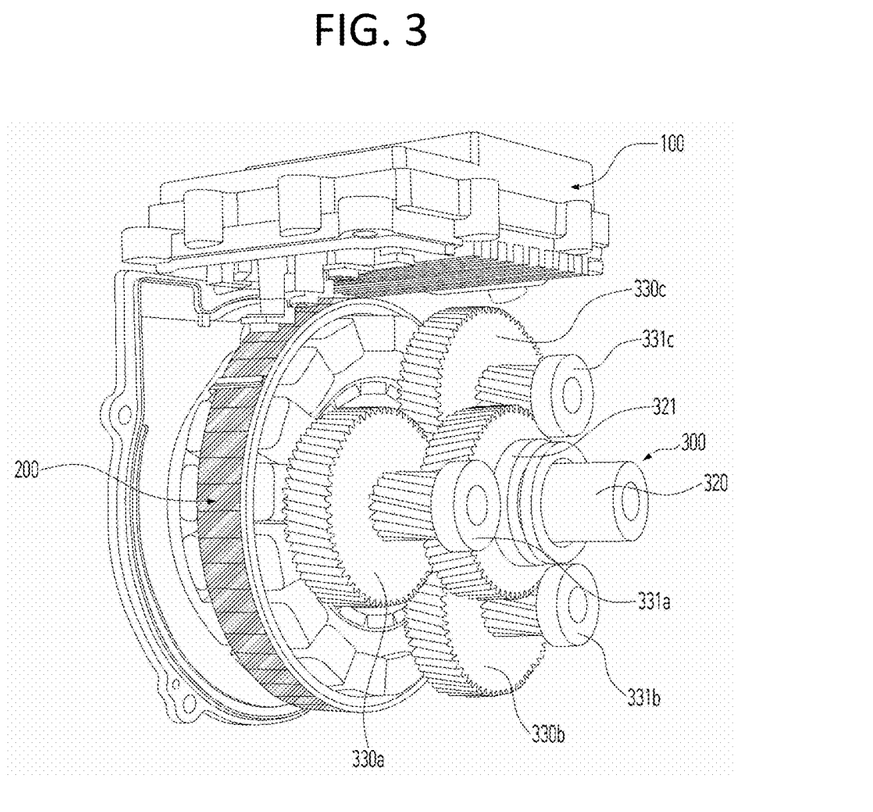
FIG. 3 is a perspective view showing a gear engagement configuration of a reducer in the driving motor system according to an embodiment comprising three planetary gears.

FIG. 3 is a perspective view showing a gear engagement configuration of a reducer in the driving motor system according to an embodiment comprising three planetary gears.

As shown in FIG. 3, three planetary gears 330a, 330b, and 330c may be provided around the input gear 310. According to this embodiment, three planetary gears 330a, 330b, and 330c are installed around the input gear 310 and the output gear 320 at intervals of 120 degrees, so that the input gear 310 and the output gear are more stably supported while forming the gear engagement.

In addition, each of the third bearings 331a, 331b, and 331c may be installed at one end in the axial direction of each of the planetary gears 330a, 330b, and 330c, so that the shaft distance between the output gear 320 and the planetary gear 330 may be effectively maintained. Although not shown in FIG. 3, in this embodiment, the fourth bearing 332 may be also installed at the other axial end of each planetary gear, such that three fourth bearings are installed.

Figure 4A:
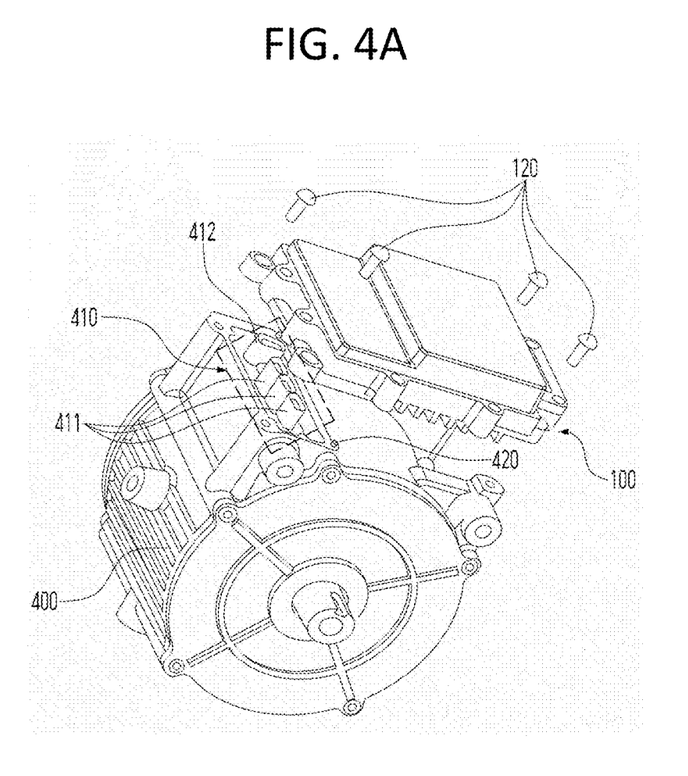
FIG. 4A and FIG. 4B are perspective views illustrating a connection structure between an inverter and a motor housing in the driving motor system according to the embodiment of the present disclosure.
Figure 4B:
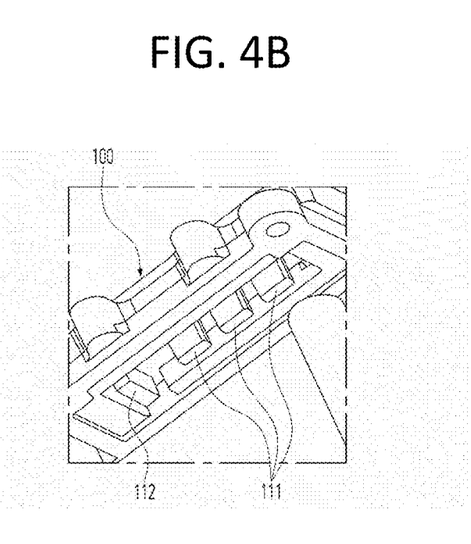

FIG. 4A and FIG. 4B are perspective views illustrating a connection structure between an inverter and a motor housing in the driving motor system according to the embodiment of the present disclosure.

The inverter 100 may be configured to receive DC power from a battery and convert it into three-phase AC power, and may include a three-phase bus bar 111 for supplying the converted three-phase AC power to the motor 200, and a sensor connector 112 for providing feedback of the detected value of the position sensor of motor 200. Further, the three-phase bus bar 111 and the sensor connector 112 may be connected to the terminal block 410 provided at the motor housing 400.

Looking more specifically with reference to FIG. 4A and FIG. 4B, a three-phase bus bar 111 for supplying power to operate the motor 200 may be installed at the inverter 100. As shown, the three-phase bus bar 111 may include three bus bars. In addition, a sensor connector 112 may be installed at the inverter 100 to provide feedback of the detected values of a position sensor or a temperature sensor of the motor 200.

Meanwhile, a terminal block 410 including a housing-side bus bar 411 and a housing-side sensor connector 412 may be formed at the motor housing 400, so that the three-phase bus bar 111 and the sensor connector 112 may be connected to the terminal block 410. In addition, at least one position pin 420 may be installed at the motor housing 400 to fix the assembly position when assembling with the inverter 100.

Accordingly, in assembling the inverter 100 to the motor housing 400 using the screw 120, if the assembling is performed by fixing the assembly position with the position pin 420, the three-phase bus bar 111 of the inverter 100 may be fastened to the housing-side bus bar 411 and the sensor connector 112 of the inverter 100 may be fastened to the housing-side sensor connector 412, thereby providing a three-phase power supply and sensor connection structure that is easy to assemble.

By having such a connection structure, not only the assembly time can be shortened due to the simplification of the assembly process, but also the assembly and disassembly between the motor and the inverter can be eased, so the replacement or repair of components can be easily performed.

Moreover, since the inverter, motor, and reducer can be manufactured as an integrated module, the overall size of the driving motor system can be reduced, and it is possible to reduce the components required for wiring.

Figure 5:
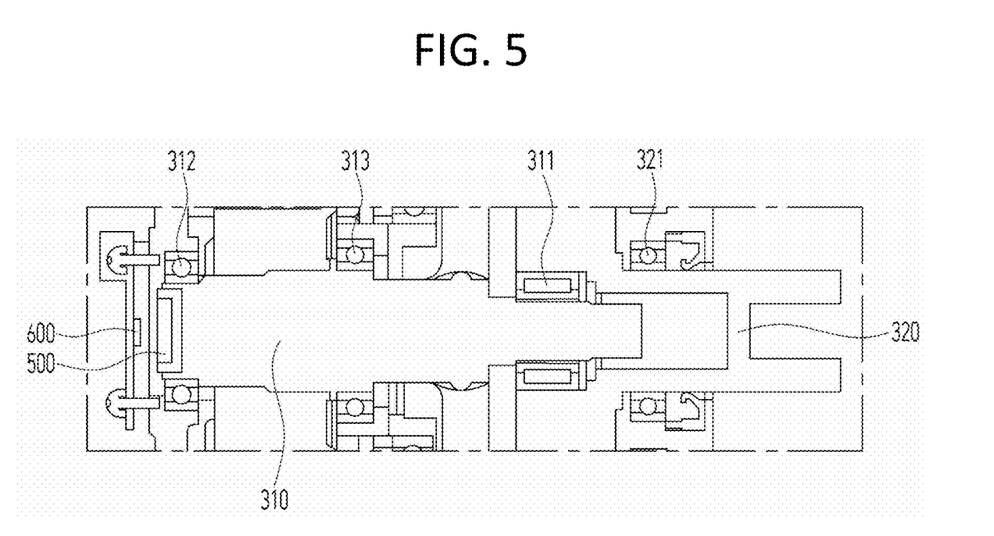
FIG. 5 is an enlarged cross-sectional view of a coaxial structure of an input gear and an output gear, and a configuration of a magnet member and a position sensor for sensing a position of the motor in the driving motor system according to the embodiment of the present disclosure.

FIG. 5 is an enlarged cross-sectional view of a coaxial structure of an input gear and an output gear, and a configuration of a magnet member and a position sensor for sensing a position of the motor in the driving motor system according to the embodiment of the present disclosure.

As described above, the first bearing 311 may be installed to support the input gear 310 and the output gear 320 concentrically, and the second bearing 321 may be installed to support the output gear 320. Therefore, the shaft of the input gear 310 and the shaft of the output gear 320 can be supported more effectively.

Also, referring to FIG. 5, in addition to the first bearing 311 and the second bearing 321, a fifth bearing 312 may be installed radially outside an end portion of the input gear 310 on the side of the motor 200. In addition, a sixth bearing 313 may be additionally installed between the first bearing 311 and the fifth bearing 312.

Due to the configuration of the fifth bearing 312 and the sixth bearing 313, the shaft of the input gear 310 can be firmly supported, and thus the coaxial structure of the input gear 310 and the output gear 320 can be maintained more effectively.

Also, referring to FIG. 5, a magnet member 500 may be installed at an end portion of the input gear 310 on the side of the motor 200. The magnet member 500 may be integrally assembled to the input gear 310, and e.g., may be installed at the input gear 310 by bonding or press-fitting.

In addition, a position sensor 600 may be installed at a position facing the magnet member 500, and the position of the motor 200 may be detected by the magnet member 500 and the position sensor 600.

Specifically, when the input gear (rotor shaft) 310 rotates by driving the motor 200, the magnet member 500 installed at the end of the input gear 310 rotates together. Further, the position of the input gear 310 can be detected by the position sensor 600 by detecting a change in magnetic flux density of the magnet member 500.

With this configuration, according to the embodiment of the present disclosure, the input gear (rotor shaft) can be stably supported by a plurality of bearings to firmly maintain the coaxial structure. Further, it is possible to detect the position of the motor more accurately by the magnet member installed at the end portion of the stably supported input gear and the position sensor installed to face the magnet member.

Figure 6A:
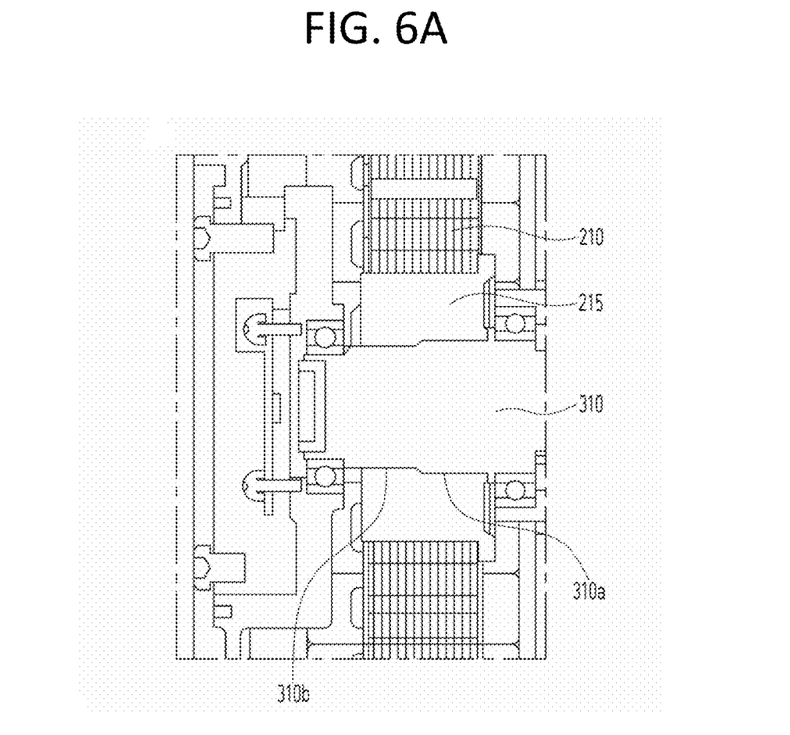
FIG. 6A is an enlarged cross-sectional view showing a specific configuration of the rotor part of the motor in the driving motor system according to the embodiment of the present disclosure.
Figure 6B:
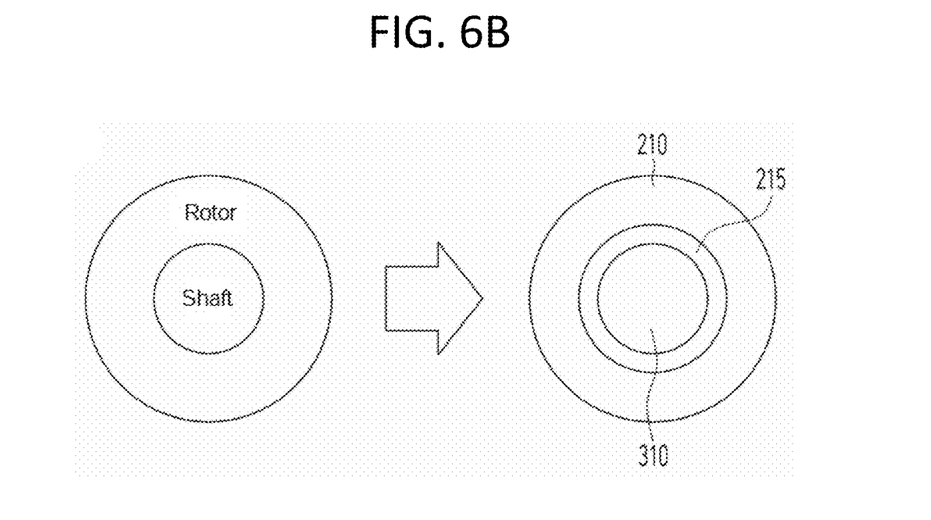
FIG. 6B is a plane view showing an improved coupling structure between the rotor and the shaft of the motor according to the embodiment of the present disclosure.

FIG. 6A is an enlarged cross-sectional view showing a specific configuration of the rotor part of the motor in the driving motor system according to the embodiment of the present disclosure, and FIG. 6B is a plane view showing an improved coupling structure between the rotor and the shaft of the motor according to the embodiment of the present disclosure.

Referring to FIG. 6A, in the driving motor system according to the embodiment of the present disclosure, the motor 200 may include the input gear 310 functioning as a rotor shaft and a rotor 210 installed around the input gear.

In addition, a rotor hub 215 may be interposed between the input gear 310 and the rotor 210. The rotor hub 215 may be made of aluminum.

In this regard, referring to FIG. 6B, in case of a rotor of a motor according to the prior art, the rotor is directly coupled to the outer circumference of the shaft of the rotor (see the left side drawing of FIG. 6B). However, in case of this structure, since the volume of the rotor including steel is large, there is a problem that the total weight of the motor is increased.

However, in the embodiment of the present disclosure, by installing the rotor hub 215 made of relatively light aluminum (Al) material between the input gear 310 and the rotor 210, since the volume occupied by the rotor 210 is reduced compared to the rotor of a general motor, the total weight of the motor can be reduced (see the right side drawing of FIG. 6B).

Also, according to the embodiment of the present disclosure, the input gear 310 may be partially knurled press-fitted to the rotor hub 215.

Referring to FIG. 6A, a part (right part on the drawing) of the input gear 310 in contact with the rotor hub 215 may be press-fitted by knurling, and a part (left part on the drawing) may not be press-fitted by knurling.

Accordingly, the part of the input gear 310 in contact with the rotor hub 215 may include a knurled portion 310a and a guide portion 310b. As shown in FIG. 6A, the guide portion 310b has a smaller radius than the knurled portion 310a.

By configuring this structure, when assembling by guiding the input gear 310 in the axial direction, the input gear 310 may be guided in the axial direction by the guide portion 310b, and the knurled press-fitting may be proceeded by the knurled portion 310a in the guided state, the concentric structure can be secured and it is possible to increase the convenience of the knurled press-fitting process.

Figure 7:
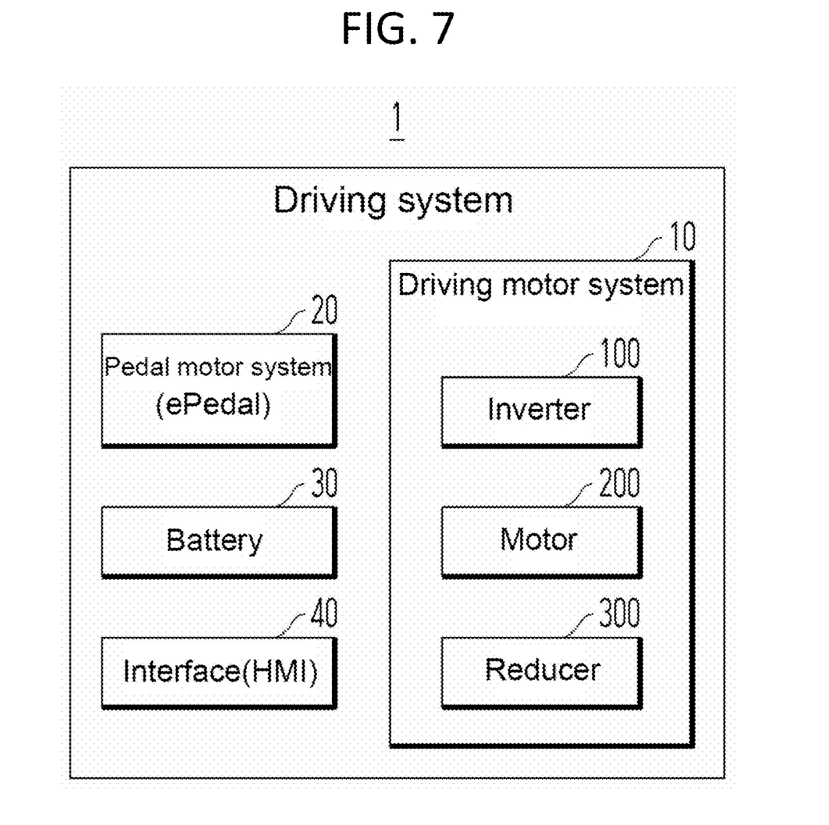
FIG. 7 is a schematic block diagram of the driving system including the driving motor system according to the embodiment of the present disclosure.

FIG. 7 is a schematic block diagram of the driving system including the driving motor system according to the embodiment of the present disclosure.

Referring to FIG. 7, the driving system 1 of the electric mobility according to the embodiment of the present disclosure may include a battery 30 that stores electric energy, a pedal motor system (ePedal) 20 that generates electric energy by driving a pedal or operating a throttle, and a driving motor system 10 mounted at at least one wheel of the electric mobility and configured to provide rotational force to the wheel. In addition, the driving system 1 of the electric mobility according to the embodiment of the present disclosure may include an interface (HMI) 40 that can be manipulated by a driver to shift a gear and includes a display.

Further, the driving motor system 10 included in the driving system 1 may include an inverter 100 that receives DC power from the battery 30 and converts it into AC power, a motor 200 that provides driving power, and a reducer 300 that increases the driving force provided from the motor 200 and transmits it the driving force to the wheel of the electric mobility.

Since the specific configuration of the driving motor system 10 has been described in detail above, a detailed description thereof will be omitted.

According to the driving system 1 including the driving motor system 10, since the packaging of the driving motor system directly mounted at at least one wheel of the electric mobility can be optimized, it is possible to provide a driving system suitable for small electric mobilities.

According to the embodiment of the present disclosure as described above, since the inverter, motor, and reducer can be provided as one integrated module, it is possible to provide a driving motor system and a driving system in which the overall volume can be reduced and space utilization can be maximized by optimizing the driving module package, while reducing components for wiring.

In addition, according to the embodiment of the present disclosure as described above, in the power transmission structure of the motor and the reducer, it is possible to provide a driving motor system and a driving system that can form a robust gear engagement structure, and can stably provide a power transmission structure in which the input shaft and the output shaft are coaxial.

In addition, according to the embodiment of the present disclosure, the total weight of the motor can be reduced by installing a rotor hub between the rotor shaft and the rotor in the rotor of the motor, and it is possible to maintain the process convenience of knurled press-fitting while maintaining a concentric structure by partially knurled press-fitting the rotor shaft to the rotor hub.

The above description of the present disclosure is for illustrative purposes, and those skilled in the art may understand that it can be easily modified into other specific forms without changing the technical spirit or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted to be included in the scope of the present disclosure.

EXPLANATION OF REFERENCE

1: Driving system
10: Driving motor system
20: Pedal motor system
30: Battery
40: Interface (HMI)
100: Inverter
111: Three-phase bus bar
112: Sensor connector
200: Motor
210: Rotor
215: Rotor hub
220: Stator
300: Reducer
310: Input gear
310a: Knurled portion
310b: Guide portion
311: First bearing
312: Fifth bearing
313: Sixth bearing
320: Output gear
321: Second bearing
330: Planetary gear (Counter gear)
331: Third bearing
332: Fourth bearing
400: Motor housing
410: Terminal block
420: Position pin
500: Magnet member
600: Position sensor

What is claimed is:

1. A driving motor system of an electric mobility, comprising:
an inverter configured to receive DC power and convert the DC power into AC power;
a motor configured to provide driving force; and
a reducer configured to increase the driving force provided by the motor and transmit the driving force to a wheel of the electric mobility,
wherein the motor and the reducer are installed inside a motor housing, the reducer comprises an input gear and an output gear, the input gear comprises a shaft which functions as a rotor shaft of the motor, and the shaft of the input gear and a shaft of the output gear are coaxial, the reducer further comprises at least one planetary gear, and the at least one planetary gear comprises a first gear portion which is directly engaged with the input gear and a second gear portion which is directly engaged with the output gear to receive the driving force from the input gear and transmit the driving force to the output gear, and
wherein the shaft of the output gear comprises a recess and the shaft of the input gear is extended in an axial direction so as to be overlapped with the output gear within the recess, and a first bearing for concentrically supporting the input gear and the output gear is provided within the recess between the shaft of the input gear and the shaft of the output gear.

2. The driving motor system of claim 1, wherein the at least one planetary gear is in plural number, and three planetary gears are provided around the input gear.

3. The driving motor system of claim 1, wherein a second bearing for supporting the output gear is provided at the output gear on a side of the motor housing.

4. The driving motor system of claim 3, wherein a third bearing and a fourth bearing for supporting the at least one planetary gear are installed at both ends of the at least one planetary gear in an axial direction.

5. The driving motor system of claim 3, wherein a fifth bearing for supporting the input gear is installed radially outside an end portion of the input gear on a side of the motor.

6. The driving motor system of claim 5, wherein a sixth bearing for supporting the input gear is additionally installed between the first bearing and the fifth bearing.

7. The driving motor system of claim 1, wherein the inverter is configured to receive DC power and convert the DC power into three-phase AC power, and comprises a three-phase bus bar for supplying the converted three-phase AC power to the motor and a sensor connector for providing feedback of detected values of a position sensor configured to detect a position of the motor, and the three-phase bus bar and the sensor connector are connected to a terminal block provided at the motor housing.

8. The driving motor system of claim 7, wherein a magnet member is installed at an end portion of the input gear on a side of the motor, and the position sensor is installed at a position facing the magnet member, and the position of the motor is detected by the position sensor.

9. The driving motor system of claim 1, wherein a rotor hub is interposed between the input gear and a rotor of the motor, and the input gear is partially knurled press-fitted to the rotor hub.

10. The driving motor system of claim 9, the rotor hub is made of aluminum.

11. A driving system of an electric mobility, comprising:
a battery configured to store electrical energy;
a pedal motor system configured to generate the electric energy by driving a pedal or operating a throttle; and
a driving motor system mounted at at least one wheel of the electric mobility to provide rotational force to the at least one wheel,
wherein the driving motor system comprises an inverter configured to receive DC power and convert the DC power into AC power; a motor configured to provide driving force; and a reducer configured to increase the driving force provided by the motor and transmit the driving force to the at least one wheel of the electric mobility, and
wherein the motor and the reducer are installed inside a motor housing, the reducer comprises an input gear and an output gear, the input gear comprises a shaft which functions as a rotor shaft of the motor, and the shaft of the input gear and a shaft of the output gear are coaxial, the reducer further comprises at least one planetary gear, and the at least one planetary gear comprises a first gear portion which is directly engaged with the input gear and a second gear portion which is directly engaged with the output gear to receive the driving force from the input gear and transmit the driving force to the output gear, and
wherein the shaft of the output gear comprises a recess and the shaft of the input gear is extended in an axial direction so as to be overlapped with the output gear within the recess, and a first bearing for concentrically supporting the input gear and the output gear is provided within the recess between the shaft of the input gear and the shaft of the output gear.

12. The driving system of claim 11, wherein the inverter is configured to receive DC power and convert the DC power into three-phase AC power, and comprises a three-phase bus bar for supplying the converted three-phase AC power to the motor and a sensor connector for providing feedback of detected values of a position sensor configured to detect a position of the motor, and the three-phase bus bar and the sensor connector are connected to a terminal block provided at the motor housing.

13. The driving system of claim 12, wherein a magnet member is installed at an end portion of the input gear on a side of the motor, and the position sensor is installed at a position facing the magnet member, and the position of the motor is detected by the position sensor.

14. The driving system of claim 11, wherein a rotor hub is interposed between the input gear and a rotor of the motor, and the input gear is partially knurled press-fitted to the rotor hub.

* * * * *